United States Patent Office 3,073,722
Patented Jan. 15, 1963

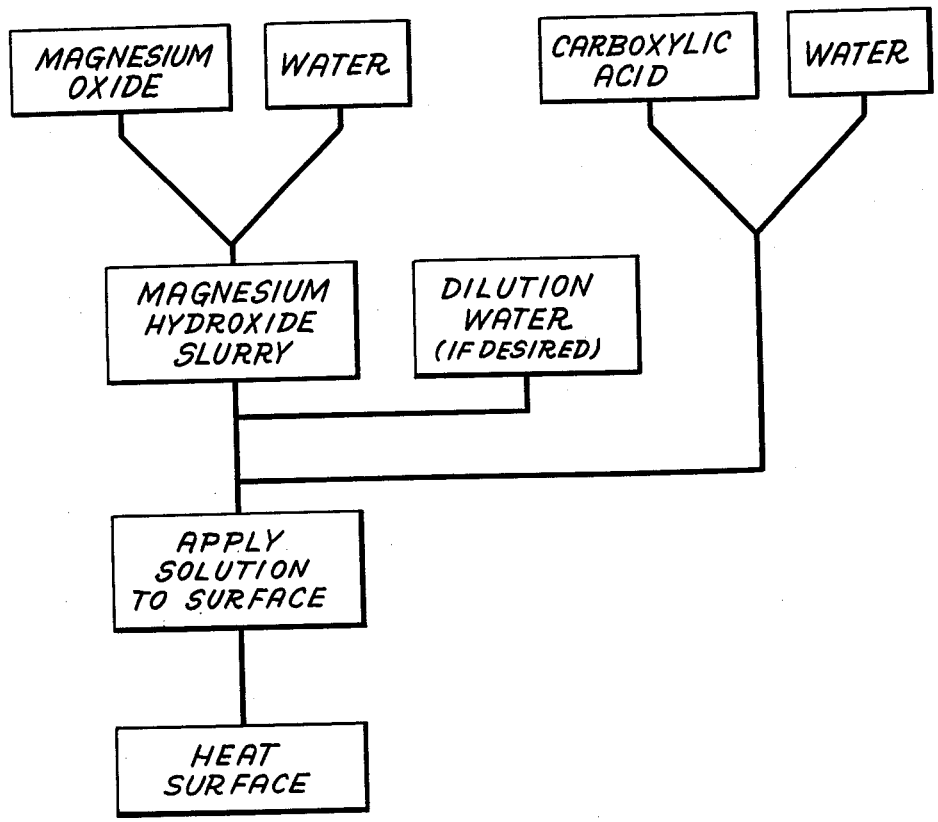

3,073,722
PROCESS FOR COATING FERROUS MATERIAL AND MATERIAL COATED BY SUCH PROCESS
Walter G. Hoehn, Broomall, Pa., and Herbert B. Forslund, Richmond, and James W. Fulton, Dalton, Mass., assignors to General Electric Company, a corporation of New York
Filed Mar. 30, 1961, Ser. No. 99,558
11 Claims. (Cl. 117—127)

This invention relates to coatings for ferrous material and, more particularly, to a process for coating ferrous material, and the material coated by such process.

In many fields of use and, in particular, in the electrical industry, it is necessary to provide a coating on ferrous material. This coating desirably performs the functions of insulating, separating and purifying the ferrous material as discussed below. For example, in the transformer art, the cores of the transformers are usually formed of a ferrous material, such as, for example, silicon steel, which may be provided with a preferred grain growth orientation to provide optimum electrical and magnetic properties. It has been found necessary to provide a coating on each of the various layers of ferrous material in the core. This coating will perform three separate functions. The first function of the coating is to provide separation of the various turns or layers of the material, for example, when used in cores, to prevent their sticking or welding together during high temperature anneals. A second function is that of aiding in the chemical purification of the ferrous material to develop the desired optimum magnetic characteristics of such material. The third function of the coating is to form on the surface of the ferrous material an insulation which will have sufficient electrical strength to provide for the electrical insulation of one layer of ferrous material from the next, for example, during its use as a core in a transformer.

In the present state of the electrical apparatus art, the most widely used coating for the ferrous material which is used as the magnetic core of the electrical apparatus is a coating of magnesium oxide and/or magnesium hydroxide. These coatings are, in general, applied to the ferrous material in the form of a suspension of magnesium hydroxide in water. The suspension comprises a quantity of magnesium oxide in water and is mixed sufficiently for the desired application, the magnesium oxide being hydrated to an extent dependent on the character of the oxide used. The term magnesium hydroxide slurry as used throughout the remainder of this specification will mean a suspension of magnesium hydroxide in water.

In the use of ferrous material, especially silicon steel, for the magnetic cores of transformers, the steel is generally annealed first to provide a grain growth anneal which develops the optimum magnetic properties of the silicon steel. This anneal is usually carried out at a temperature ranging from approximately 950 to 1200° C. This anneal also aids in purifying the steel, aided by the coating placed on the steel. After the magnetic core has been formed, a stress relief anneal is provided to relieve the stresses which have developed in the silicon steel of the magnetic core due to the mechanical working of the steel in formation of such core. These stress relief anneals are generally carried out at a temperature of approximately 840° C.

A more economical method of manufacture has been developed in which the grain growth anneal of the silicon steel is deferred until after the core has been formed. In this method it is then possible to provide both a grain-growth anneal and a stress-relief anneal at the same time. A suitable temperature of approximately 1150° C. is used, under proper atmospheric conditions, to provide this dual anneal. However, as will be understood, in either instance it is necessary to provide an interlaminar separator to prevent the sticking or welding of the turns during the anneal, as well as to provide the other two functions as hereinbefore noted.

As will be well understood, where the grain growth anneal is provided prior to the formation of the magnetic core, the coating, which is placed on the steel before the anneal, will be hardened by the anneal. However, where the grain growth anneal is provided after the formation of the core, it will be apparent that the coating will not be in the hard form which is formed during the high temperature anneal. Therefore, in the formation of the core, the coating is more readily apt to flake and break off during the handling which is necessary in making the magnetic core.

As hereinbefore noted, the coating which is generally applied to ferrous material in the present state of the art is a coating of magnesium oxide and/or magnesium hydroxide which is applied in the form of a water slurry. The coating is then dried to leave a thin layer of coating material on the surface of the ferrous material. In the present state of the art it is not, in general, possible to provide a satisfactory coating on the surface of a ferrous material using a substantially pure magnesium oxide and/or magnesium hydroxide slurry. The substantially pure magnesium hydroxide slurry will not form a sufficiently adherent layer of coating material of proper thickness on the ferrous material to withstand the subsequent handling and bending of the coated ferrous material, for example, the bending necessary in the formation of a magnetic core. The coating, under such circumstances, has a great tendency to flake and drop off thus creating excessive dust during the formation of the core with its resulting problems to equipment and to the health of the workmen. Of course, such flaking also results in inferior interlaminar insulation after annealing.

A number of additives have been proposed to be added to the magnesium hydroxide slurry which would help the magnesium hydroxide to adhere to the surface of the ferrous material. However, it has been found that many of these additives create other problems. For example, many of these additives introduce additional carbon or other contaminants to the steel, thereby causing either higher initial losses or higher ageing losses, or both such additional losses, when such material is used in magnetic cores for electrical magnetic apparatus. From the above it is obvious that there is a great need in the electrical industry for a coating material which will form a tenacious, adherent coating on ferrous material, such as silicon steel, while at the same time not detracting from the optimum magnetic characteristics of such silicon steel.

It is, therefore, one object of this invention to provide a tenacious coating on ferrous material comprised substantially of magnesium hydroxide, which coating will not detract from the magnetic properties of the ferrous material.

It is a further object of this invention to provide a process for coating ferrous material with a coating comprised substantially of magnesium hydroxide.

It is a further object of this invention to provide a coating of magnesium hydroxide utilizing an additive which will provide a tenacious, coherent film of the hydroxide to ferrous material without detracting from the magnetic properties of such materials.

It is a further object of this invention to provide an additive for a magnesium hydroxide slurry which additive will materially aid the magnesium hydroxide in firmly adhering to a ferrous material without having any deleterious effects on the characteristics of the ferrous material.

In carrying out this invention in one form, an adherent film substantially of magnesium hydroxide is provided on the surface of a strip of ferrous material by first providing a slurry comprising a suspension of magnesium hydroxide in water. A carboxylic acid is then added to the slurry and admixed therewith. The suspension is then applied to the surface of the ferrous material in any desired manner and then dried to remove any excess absorbed water. An adherent film comprised substantially of magnesium hydroxide will remain on the surface of the ferrous material.

The features of this invention which are believed to be novel are set forth with particularity in the appended claims. However, it is believed that the invention itself and the manner in which its objects are obtained, as well as other objects and advantages thereof, will be more fully understood by reference to the following detailed description thereof, when read in connection with the accompanying drawing. The drawing is a flow diagram illustrating one form of the process of this invention.

It has been discovered that unexpected, improved results may be obtained in magnesium hydroxide coatings for ferrous magnetic material when the slurry of magnesium hydroxide is provided with an additive of a carboxylic acid. In general, it has been discovered that when a quantity of a carboxylic acid, ranging from 2 to 20 parts by weight of acid to 100 parts by weight of magnesium hydroxide is admixed in a slurry of magnesium hydroxide that the mixture obtained, when applied to the surface of ferrous material, will provide a very strong, tenacious coating which adheres to the ferrous material and coheres to itself. The coating obtained on the ferrous material by such mixture is highly resistant to flaking even prior to any high temperature annealing step and is strongly bonded to the ferrous material, such that it resists flaking during the handling and bending which is necessarily encountered, for example, during the formation of the ferrous material into a magnetic core.

In making magnesium hydroxide coatings of this invention, an aqueous suspension of magnesium hydroxide is employed. In the preferred method of forming the slurry, a magnesium oxide powder is used. In forming this slurry approximately 5.5 to 8% by weight of magnesium oxide is suspended in water and is thoroughly mixed until substantially complete hydration of the magnesium oxide is obtained. Thus the slurry will be substantially magnesium hydroxide. However, as will be understood by those skilled in the art, with the commercial grades of magnesium oxide available today, it is not always possible to obtain complete hydration of all of the magnesium oxide particles. Additional water may be added and mixed with the slurry at this time, if desired, to reduce the viscosity of the suspension. A 10% concentration of a carboxylic acid is added to this slurry in an amount ranging from 3 to 30 parts by weight of acid to 100 parts by weight of the original magnesium oxide powder or 2 to 20 parts by weight to 100 parts by weight of the magnesium hydroxide in the slurry. The slurry is again completely mixed so as to obtain substantially a complete mixing of the carboxylic acid throughout the suspension.

If a suspension of less than approximately 5.5% by weight of magnesium oxide powder is used to form the slurry, the resultant coating does not provide a sufficient amount of magnesium hydroxide to the ferrous material. When the suspension contains more than approximately 8% by weight of magnesium oxide powder, the slurry becomes too difficult to process in the desired manner. Also, the addition of the carboxylic acid of less than approximately 3 parts by weight per 100 parts by weight of the original magnesium oxide powder provides substantially no improvement in the adhesion and cohesion of the coating to the ferrous material beyond that which would be obtained from a magnesium hydroxide slurry without any addition of the carboxylic acid. Further, if more than approximately 30 parts by weight of the carboxylic acid per 100 parts by weight of the original magnesium oxide powder is added to the slurry, the adhesion and cohesion of the coating obtained deteriorates very rapidly.

The resulting coating which is obtained by the above-noted mixture may be applied to the surface of a ferrous material in any desired manner, such as, for example, by roller coating on the material. This coating may be dried upon the sheet at a surface temperature not more than approximately 135° C. If the drying is carried out above this temperature, there is a tendency for the coating to break down, leaving a spotty coating rather than the thin, even coat desired. After drying there remains on the surface a thin film of substantially magnesium hydroxide which has an excellent resistance to abrasions and which will permit 90° bending without flaking of the coating thereon. For example, a coating of the above mixture was applied to a strip of silicon steel 0.012 inch thick. The coating obtained was approximately 0.02 to 0.03 ounce per square foot of steel and did not flake when subjected to 90° bending. After formation of a magnetic core of silicon steel, having been coated by the above mixture, the core may then be subjected to a high temperature anneal either of the grain growth anneal in the range of approximately 950 to 1200° C. or of a stress relief anneal of approximately 840° C. without damage to the coating and without sticking or welding of the various layers of the silicon steel.

The invention herein described is extremely useful in providing a strong, tenacious coating on ferrous material. All of the carboxylic acids tested have proved helpful in forming a coherent coating and in aiding the adhesion of such coating to the steel material. As an example of some of the carboxylic acids which have been used in the process of this invention and have proved helpful in coating ferrous material, the following may be cited: Acetic acid, citric acid, formic acid, fumaric acid, maleic acid and malonic acid, which, as will be noted, are all aliphatic carboxylic acids.

In preparing suspensions according to the method of this invention, the following examples set forth different suspensions which have been found satisfactory in carrying out this invention.

*Example 1.*—An aqueous suspension of approximately 7% by weight of magnesium oxide was prepared and the suspension thoroughly mixed until substantially complete hydration of the magnesium oxide was obtained. A 10% concentration of citric acid was prepared. A sufficient amount of the solution was added to the slurry to obtain a composition having 7 grams of magnesium oxide, 111 grams of water and 2 grams of citric acid. The slurry was thoroughly mixed to completely disperse the citric acid throughout the suspension. The slurry was continuously mixed during addition of the acid. It was noted that the viscosity of the suspension first increased and then decreased to a fairly low value during the addition. After the addition was completed, the suspension was then coated on the surface of silicon steel by roller coating. The coated silicon material was then dried at a surface temperature of approximately 135° C. thus forming a firmly adherent coating substantially of magnesium hydroxide on the silicon steel material.

In the following example another carboxylic acid was utilized.

*Example 2.*—In this example a slurry of approximately 7% by weight of magnesium oxide in water was prepared, the slurry being thoroughly mixed until substantially complete hydration of the magnesium oxide was obtained. To this slurry was then added approximately 15 parts by weight of oxalic acid crystals to 100 parts by weight of the starting magnesium oxide powder, the oxalic acid being first mixed with water to form a 10% concentration. The slurry was then completely mixed to obtain substantially complete mixing of the oxalic acid throughout the suspension. The mixture was then coated on a silicon steel strip by the use of roller coating. The coated material was then dried by heating the steel to a surface temperature of approximately 135° C. leaving a very tenacious, adherent film substantially of magnesium hydroxide.

It will be understood that the above examples are for illustrative purposes only and should not be considered as limiting the scope of the invention herein set forth. While this invention has been disclosed with reference to particular embodiments, it should be understood that various changes may be made without departing from the spirit and scope of the invention as defined in the appended claims.

What is claimed as new and which it is desired to secure by Letters Patent of the United States is:

1. A ferrous material having thereon a firmly adherent coating comprising magnesium hydroxide and an aliphatic carboxylic acid formed by appication of a slurry consisting essentially of an aqueous suspension of approximately 5.5 to 8% by weight magnesium hydroxide and an aliphatic carboxylic acid, said acid being present in a quantity ranging from 2 to 20 parts by weight to each 100 parts by weight of said magnesium hydroxide, said coating being dried at a temperature not in excess of approximately 135° C.

2. A ferrous material having on the surface thereof a firmly adherent coating composed of magnesium hydroxide and a carboxylic acid formed by application of a slurry consisting essentially of an aqueous suspension of 5.5 to 8% by weight of magnesium hydroxide and a carboxylic acid, selected from the group consisting of acetic acid, citric acid, formic acid, fumaric acid, maleic acid, malonic acid, and oxalic acid, said carboxylic acid being present in a quantity ranging from 2 to 20 parts by weight to each 100 parts by weight of said magnesium hydroxide, said coating being dried at a temperature of approximately 135° C.

3. A method of forming an adherent coating on the surface of ferrous material consisting of the steps of forming an aqueous slurry containing approximately 5.5 to 8% by weight of magnesium hydroxide, adding 2 to 20 parts by weight of an aliphatic carboxylic acid to said slurry for each 100 parts by weight of said magnesium hydroxide, applying said slurry to the surface of the ferrous material and then heating said surface to a temperature not in excess of approximately 135° C. to dry said slurry and leave on said surface a tenacious coating of magnesium hydroxide and carboxylic acid.

4. A method as set forth in claim 3 wherein said carboxylic acid is formic acid.

5. A method as set forth in claim 3 wherein said carboxylic acid is oxalic acid.

6. A method of forming an adherent coating on the surface of a ferrous material consisting of the steps of forming a slurry of approximately 7% by weight magnesium hydroxide in water, adding an aliphatic carboxylic acid to said slurry, said carboxylic acid ranging from 2 to 20 parts by weight per 100 parts by weight of said magnesium hydroxide, applying said slurry to the surface of the ferrous material, and drying said slurry on the surface at a temperature not in excess of approximately 135° C. to obtain a tenacious coating.

7. A method of forming an adherent coating on the surface of a ferrous material consisting of the steps of forming a slurry of 5.5 to 8% by weight of magnesium hydroxide and water, adding to said slurry citric acid in an amount ranging from 2 to 20 parts by weight of said citric acid to 100 parts by weight of said magnesium hydroxide, applying said slurry to said surface of said ferrous material, heating the surface of said material to approximately 135° C. to dry said slurry and form thereon a tenacious, coherent coating.

8. A method of forming an adherent coating on the surface of ferrous material consisting of the steps of forming an aqueous slurry of magnesium hydroxide, said slurry consisting essentially of approximately 5.5 to 8% by weight of magnesium oxide suspended in water, adding carboxylic acid selected from the group consisting of acetic acid, citric acid, formic acid, fumaric acid, maleic acid, malonic acid, and oxalic acid to said slurry in the amount of approximately 3 to 30 parts by weight of said acid to 100 parts by weight of said magnesium oxide, applying the resulting slurry to the surface of the ferrous material, and then heating said surface to approximately 135° C. to dry said resulting slurry and leave on said surface a tenacious coating of magnesium hydroxide and carboxylic acid.

9. A method as set forth in claim 8 wherein said carboxylic acid is formic acid.

10. A method as set forth in claim 8 wherein said carboxylic acid is oxalic acid.

11. A method as set forth in claim 8 wherein said carboxylic acid is citric acid.

References Cited in the file of this patent

UNITED STATES PATENTS

| | | |
|---|---|---|
| 507,082 | Raudnitz | Oct. 17, 1893 |
| 2,796,364 | Suchoff | June 18, 1957 |
| 3,012,917 | Riou et al. | Dec. 12, 1961 |